US010722817B2

(12) United States Patent
Schlensker et al.

(10) Patent No.: US 10,722,817 B2
(45) Date of Patent: Jul. 28, 2020

(54) OIL/WATER SEPARATOR WITH COMPRESSED AIR CHARGING

(71) Applicant: BEKO TECHNOLOGIES GMBH, Neuss (DE)

(72) Inventors: Herbert Schlensker, Leverkusen (DE); Johannes Sinstedten, Korschenbroich (DE)

(73) Assignee: BEKO TECHNOLOGIES GMBH, Neuss (DE)

( * ) Notice: Subject to any disclaimer, the term of this patent is extended or adjusted under 35 U.S.C. 154(b) by 0 days.

(21) Appl. No.: 15/578,036

(22) PCT Filed: Jul. 22, 2016

(86) PCT No.: PCT/EP2016/067516
§ 371 (c)(1),
(2) Date: Nov. 29, 2017

(87) PCT Pub. No.: WO2017/017008
PCT Pub. Date: Feb. 2, 2017

(65) Prior Publication Data
US 2018/0161698 A1    Jun. 14, 2018

(30) Foreign Application Priority Data

Jul. 24, 2015 (DE) .................. 10 2015 112 092

(51) Int. Cl.
*B01D 17/02* (2006.01)
*B01D 17/12* (2006.01)
(Continued)

(52) U.S. Cl.
CPC ..... *B01D 17/0202* (2013.01); *B01D 17/0208* (2013.01); *B01D 17/0214* (2013.01);
(Continued)

(58) Field of Classification Search
CPC ............ B01D 17/0202; B01D 17/0208; B01D 17/0214; B01D 17/08; B01D 17/12;
(Continued)

(56) References Cited

U.S. PATENT DOCUMENTS 6,495,033 B1 * 12/2002 Talboom ............ B01D 17/0208
210/167.04

FOREIGN PATENT DOCUMENTS

DE    102006009542 A1    9/2006
EP       0436773 A2      7/1991
(Continued)

OTHER PUBLICATIONS

International Search Report dated Nov. 3, 2016 re: Application No. PCT/EP2016/067516; pp. 1-2; citing: EP 0 846 485 A and EP 0 436 773 A2.

*Primary Examiner* — Terry K Cecil
(74) *Attorney, Agent, or Firm* — Cantor Colburn LLP

(57) ABSTRACT

An oil/water separator for removing oil-containing constituents from an oil/water mixture includes a main filter designed to separate oil-containing constituents from the oil/water mixture. Untreated oil/water mixture is supplied to the main filter and is removed from the oil/water separator after passing through the main filter, wherein the oil/water separator is designed for supply and removal of these liquids in accordance with the hydrostatic principle. The oil/water separator has a control unit designed to temporarily charge the oil/water separator with control air, by means of which overpressure can be used to push oil/water mixture through the main filter.

14 Claims, 4 Drawing Sheets

(51) Int. Cl.
*B01D 17/00* (2006.01)
*C02F 1/00* (2006.01)
*C02F 1/28* (2006.01)
*C02F 1/40* (2006.01)
*C02F 101/32* (2006.01)

(52) U.S. Cl.
CPC .............. *B01D 17/08* (2013.01); *B01D 17/12* (2013.01); *C02F 1/008* (2013.01); *C02F 1/283* (2013.01); *C02F 1/40* (2013.01); *C02F 2101/32* (2013.01); *C02F 2209/42* (2013.01)

(58) Field of Classification Search
CPC .. C02F 1/008; C02F 1/283; C02F 1/40; C02F 2101/32; C02F 2209/42
See application file for complete search history.

(56) References Cited

FOREIGN PATENT DOCUMENTS

| | | | |
|---|---|---|---|
| EP | 0846485 | A1 | 6/1998 |
| JP | H10211407 | A | 8/1998 |
| JP | 2000046462 | A | 2/2000 |
| JP | 2004500228 | A | 1/2004 |
| WO | 2011104368 | A1 | 9/2011 |

* cited by examiner

OIL/WATER SEPARATOR WITH COMPRESSED AIR CHARGING

TECHNICAL FIELD

The disclosure relates to an oil/water separating device for removing oil-containing constituents from an oil/water mixture, comprising a main filter which is designed to separate oil-containing constituents from the oil/water mixture.

BACKGROUND

Oil/water separating devices of this type are frequently used in connection with air compressors. Air compressors produce compressed air by sucking in and compressing ambient air. In the process, the air humidity contained in the ambient air accumulates as a condensate due to physical reasons and due to the compressed air being dried. This condensate, being an oil/water mixture, is waste water which, owing to the content of lubricants, most frequently is not permitted to be discharged into the public sewer because it exceeds the hydrocarbon concentration limits.

Given a volume flow of 60 m$^3$/h sucked-in air, a mostly discontinuous condensate flow of 1.23 l/h charged with 240 mg/h oil may typically be produced. This corresponds to 195 mg oil per liter of condensate. These values may fluctuate depending on various parameters, these parameters including, for example, climate conditions (ambient temperature and humidity), the type of oil used in the compressor and the construction and mode of operation of the compressor. The bond between water and the lubricant also varies and ranges from a mixture of oil and water to a dispersion and an emulsion. Admissible values for discharge into the sanitary sewer are, however, in the order of 10-20 mg/l, in part even 5 mg/l (oil/condensate). Thus, a special waste is produced which has to be disposed of by a waste disposal company, even though 99.5% percent of it is water from ambient air humidity.

For treating such a condensate, the use of oil/water separators is therefore known. In this case, the object of commercially available oil/water separators is to treat the condensate on-site so that it can be discharged, i.e. to remove the oil fractions from the water in a cost-effective manner. Known apparatuses of this design usually employ several separating stages in order to achieve the desired purity of the water. In the process, the condensate is typically discharged slowly, and thus with little turbulence, into a pre-separator via a pressure relief element. The former works according to the principle of gravity separation and provides for the deposition of heavy, sedimentary contaminants (density greater than 1 kg/dm$^3$) and the floating of free oil fractions (density lower than 1 kg/dm$^3$). These oil fractions then flow towards a collecting container. In a second stage, fine oil droplets are separated from the condensate by means of an adsorption filter, wherein the adsorption filters are frequently based on an oleophilic material and active carbon with a very large internal surface.

In another design according of the oil/water separator, the condensate, together with the free oil fractions, is fed through an adsorption filter, which in turn floats on the condensate surface and soaks up oil fractions that deposit here (density greater than 1 kg/dm$^3$). Such an oil/water separator is known, for example, from DE 10 2006 009 542 A1. The design of this oil/water separator works according to the principle of corresponding water columns, wherein treated condensate leaves the apparatus at the pure-water outlet towards the sewer in the same amount as new condensate flows in.

In such oil/water separators, the collected free oils and the oil-saturated filters are usually thermally utilized, but may also be treated. Strongly dispersed or even emulsified condensates cannot be treated in these apparatuses and are usually treated by more complex methods, e.g. by diaphragm, evaporation or decomposition processes.

In operating such oil/water separators, there is often the problem that the flow resistance of the filters increases due to the saturation of the upper layers or due to a formation of biological slimy layers. In order to prevent overflowing or backwater, the filters must therefore be changed early, even though their capacity is not yet exhausted. To solve this problem, WO 2011/104 368 A1 proposes providing a mechanical separating device for separating slime-like substances and an electrical pump which sucks the condensate through the filter and thus overcomes flow resistance. This operation takes place if condensate is present, and is controlled through an electronic level detection means. In principle, the flow through the filter takes place only by means of the pump, which entails the aforementioned advantages but is accompanied by increased energy costs.

BRIEF SUMMARY

The disclosure provides an oil/water separating device that can be operated simply and with little energy expenditure.

According to the disclosure, this is achieved by providing an oil/water separating device comprising a main filter configured to separate oil-containing constituents from the oil/water mixture, wherein an oil/water mixture to be purified is supplied to the main filter and is removed from the oil/water separating device after passing through the main filter, and the oil/water separating device is configured for supplying and removing of these liquids in accordance with the hydrostatic principle, wherein the oil/water separating device has a control unit configured for temporarily charging the oil/water separating device with control air, by means of which oil/water mixture can be pushed through the main filter by means of overpressure. Advantageous embodiments of the device are apparent from dependent claims.

It must be noted that the features cited individually can be combined with each other in any technologically meaningful manner and represent other embodiments of the disclosure. The description, in particular in connection with the figures, additionally characterizes and specifies the disclosure.

The oil/water separating device according to the disclosure is suitable for removing oil-containing constituents from an oil/water mixture, wherein the oil/water mixture may be, in particular, the condensate of an air compressor. However, the device is also suitable for treating similar oil/water mixtures, the terms "oil/water mixture" and "condensate" being used synonymously only for describing the disclosure.

The device comprises a main filter which is designed to separate oil-containing constituents from the oil/water mixture, wherein an oil/water mixture to be purified is supplied to the main filter and is removed from the oil/water separating device after passing through the main filter. In this case, the oil/water separating device is configured for supplying and removing these liquids in accordance with the hydrostatic principle. Thus, treated condensate leaves the apparatus in the same amount as new condensate flows into the device, in accordance with the principle of corresponding water columns. This principle may be realized in various known manners, in particular with correspondingly configured containers and riser pipes.

In principle, the device can thus be operated without an additional energy supply and continuously separate oil-containing constituents from an oil/water mixture. This may be considered the normal operation of the device. According to the disclosure, the oil/water separating device has a control unit, however, which is configured for temporarily charging the oil/water separating device with control air, by means of which oil/water mixture can be pushed through the main filter by means of overpressure. If necessary, such a pressure charge may take place in order to push condensate through the filter. This is necessary particularly if the flow resistance of the filter has increased.

Thus, the disclosure provides a device which, in normal operation, can be simply operated in a known manner in accordance with the hydrostatic principle, but which, if the flow resistance of the filter is increased, is capable of overcoming it by charging with pressure and thus prevent the apparatus from overflowing. Therefore, the device has two modes of operation that can be used alternately. The passage of oil/water mixture through the filter can thus be maintained, even if the flow resistance has increased. This results in a higher operating life for the separating device. This is particularly advantageous in cases where regular maintenance intervals are scheduled but a replacement of the filter elements is to be avoided in between the scheduled maintenance dates. With the disclosure, the operation of the device can be maintained until the next maintenance interval.

To detect an increased flow resistance of the filter, sensor means for detecting the oil/water mixture filling level can be provided in the oil/water separating device, which are connected to the control unit. If the flow resistance of the filter rises, the condensate filling level in the device also rises. In one embodiment of the disclosure, the control unit then is configured for temporarily charging the oil/water separating device with control air if a predetermined oil/water mixture filling level A was detected by the sensor means. This filling level A constitutes the maximum condensate filling level, which should not be exceeded if possible.

In this case, the control unit may perform various evaluation and controlling functions, wherein it may also be configured for interaction with a user. To this end, it may comprise displays and inputting means for inputting commands, for example. In particular, the control unit may also be configured for charging the oil/water separating device with control air because of a control command to the control unit. This may be used particularly during the maintenance of the device in order to squeeze a filter empty, if necessary. This function is advantageous if replaceable filter cartridges are used, for example, because condensate can thus be largely removed from an oil/water separating device before a filter cartridge is screwed on. Otherwise, a lot of liquid would run out of the device when the filter cartridge is replaced, or this would have to be prevented with corresponding measures.

The control unit may further be configured to cease charging the oil/water separating device with control air again if a predetermined oil/water mixture filling level B was detected by the sensor means. This filling level B is below the maximum filling level A and constitutes a level at which, if reached, the charging with pressure is to be terminated. After the control air is switched off, condensate can flow again and again increase the filling level until a charging with pressure is carried out again, so that the two modes of operation can also alternate. The working range of the device is then between the levels A and B.

Another filling level C, which is below the filling level B, may optionally be defined. This level C constitutes a lower alarm point, because the filling level is supposed not to drop below this level. If the condensate level drops below this level C, various measures may be provided. For example, an alarm may be outputted and/or the device may be automatically switched off.

Preferably, the supply of oil/water mixture into the oil/water separating device is stopped during the charging with control air. In this way, a corresponding feed, through which control air may otherwise escape, can be tightly sealed. Depending on the construction of the oil/water separating device, this may be necessary or at least advantageous for generating overpressure by means of the control air.

In one embodiment of the disclosure, the oil/water separating device has a housing, means for supplying the oil/water mixture into a chamber within this housing, and a connecting opening for transferring the oil/water mixture from this chamber into the main filter. The control unit is configured for temporarily charging the chamber with control air, during which control air is conducted into the chamber within the housing in such a manner that the oil/water mixture is pushed from the chamber through the connecting opening into the main filter by means of overpressure. In a preferred embodiment, the supply of oil/water mixture into this chamber is stopped in the process.

The supply of control air for generating an overpressure in the chamber may be carried out in different manners and with different valves. In principle, a feed pipe for the control air and means with which other openings of the chamber can be sealed in order to be able to build up the overpressure in the chamber above the condensate may in this case be provided. In one embodiment of the disclosure, the control air and the oil/water mixture are conducted into the chamber of the housing via a common diaphragm valve, which may be configured in different ways and, in particular, is capable of being activated by the control air. For example, the diaphragm valve has a control air chamber and a mixture chamber for this purpose, which are separated from each other by a diaphragm. The diaphragm valve further has a mixture inlet for supplying oil/water mixture into the mixture chamber and a control air inlet for supplying control air into the control air chamber, with a mixture outlet for removing the oil/water mixture from the mixture chamber into the chamber within the housing and a control air outlet for removing the control air from the control air chamber into the chamber of the housing also being provided. The mixture inlet of this valve can be closed by charging the control air chamber with control air by means of the diaphragm. With this valve, control air can thus be introduced into the chamber of this housing by flowing through the control air chamber into the chamber of the housing. At the same time, however, the further flow of condensate into the chamber of the housing can be stopped by the control air moving the diaphragm in such a manner that it closes the mixture inlet to the diaphragm valve. Further, the diaphragm also seals the mixture inlet so that no air is able to escape through it.

In order for the control air to be able to build up sufficient pressure in the control air chamber for activating the diaphragm, the control air outlet of the diaphragm valve preferably has a smaller opening cross section than the control air inlet. Thus, the control air at first quickly builds up pressure in the control air chamber and moves the diaphragm before it continues to build up pressure within the chamber of the housing.

Though the feed of oil/water mixture to the diaphragm valve during the charging with control air may be interrupted by means of the diaphragm, this may also be supplemented with a general interruption of the supply of mixture to be purified to the oil/water separating device or the diaphragm valve. The pressure of the mixture on the diaphragm could otherwise become so high that it opens again.

Appropriately, control air with overpressure is used, wherein the overpressure can be suitably selected. Preferably, it is in the order of 0.3-1 bars, in particular, however, at about 0.5 bars. If the oil/water separating device is connected to a compressed air pipe with a higher pressure, a corresponding pressure reduction may take place before or after supplying the control air to the device. For example, the pressure may be reduced from 7 bars to 0.5 bars or other pressures.

An overpressure of 0.5 bars has proved to be sufficient in order to overcome typically occurring flow resistances and push condensate through the filter. In this case, an overpressure in this order is advantageous in that the oil/water separating device thus does not count as a pressure container in the sense of the Pressure Equipment Directive (PED) of the European Union. Otherwise, the oil/water separating device would have to comply with the special requirements of this guideline.

In addition to the basic function of separating oil-containing constituents in the main filter, the oil/water separating device may have other functional elements. For example, it may be provided that the housing of the device has an inlet opening via which oil/water mixture can first be conducted into a pressure relief chamber within the housing, from which the oil/water mixture can then be conducted into the chamber of the housing. Compressed air transported along with the condensate may escape from this pressure relief chamber, which preferably takes place when flowing through another filter in order to purify the escaping air or avoid the escape of oil-containing constituents. In order to make it impossible for air to escape through this pressure relief outlet when the device is charged with pressure, the outlet may be sealable with a closable valve, which can also be activated by the control unit. If an above-described diaphragm valve is used, the pressure relief chamber is connected to the mixture chamber of the diaphragm valve via the mixture inlet.

In order to remove free oil fractions from the condensate already before the main filter, it may be provided in one embodiment of the disclosure that these free oil fractions floating on the oil/water mixture in the chamber of the housing be discharged from the chamber via a collective drain. The collective drain may be connected to a collecting container. This collective drain can also be closed during the charging of the chamber with control air by the control unit. Thus, air is also incapable of escaping through this pipe.

DETAILED DESCRIPTION

Figure 1:
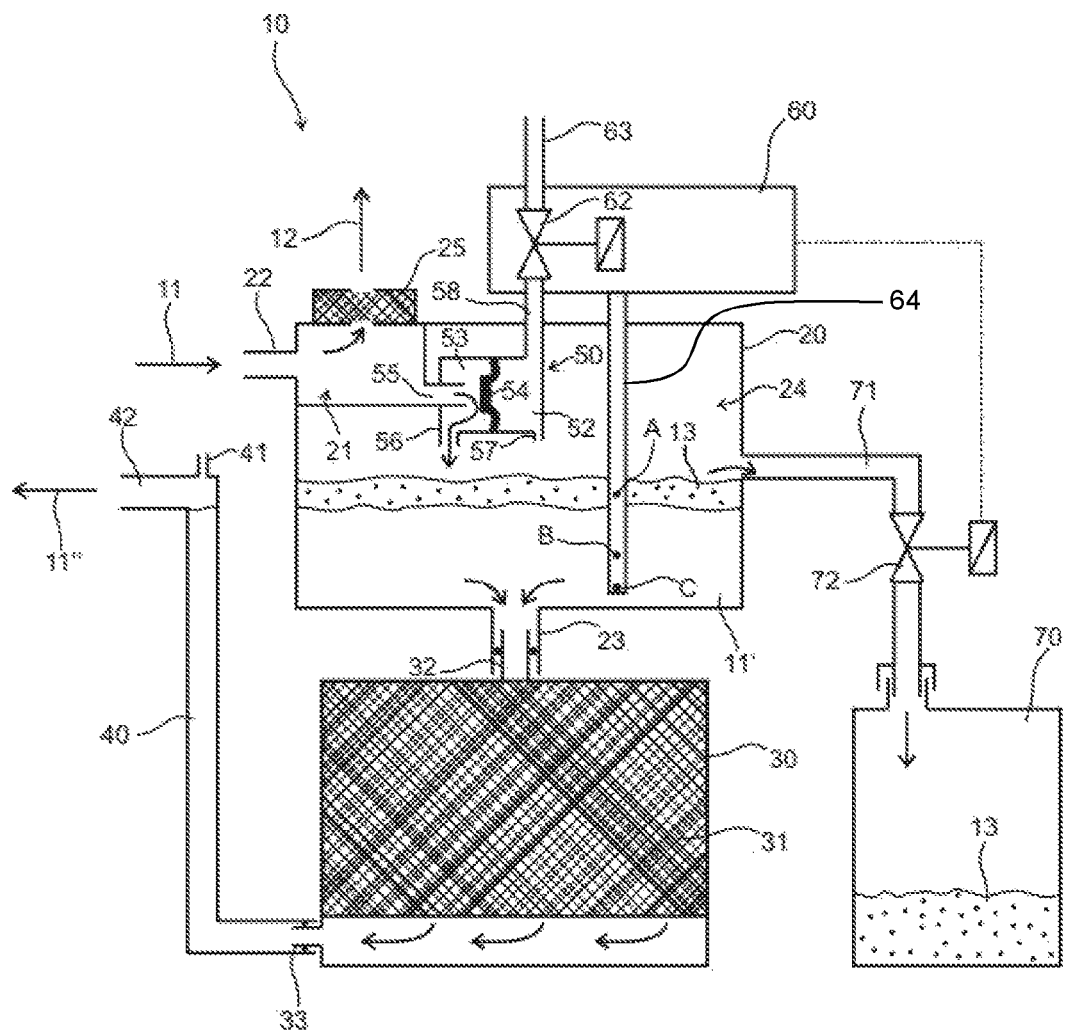
FIG. 1 shows a schematic illustration of a first embodiment of the oil/water separating device according to the disclosure in normal operation.

The first embodiment of an oil/water separating device 10 according to the disclosure shown schematically in FIG. 1 comprises various components. In this case, the device at least comprises a main filter 30 configured for treating an oil/water mixture or condensate 11 from an air compressor, which is not shown, by oil-containing constituents being separated from this condensate. This may occur by means of adsorption to a filter material, wherein the main filter 30 preferably comprises a material that is capable of separating liquids with finely dispersed, even emulsified, oils so that they are ready for being supplied. For this purpose, oleophilic melt-spun polymer with a distribution-oriented surface compaction and shape and activated carbon with an adapted consistency and size for absorbing finest oil droplets and oleophilic foamed polymer are suitable. The main filter 30 has a housing into which a corresponding adsorption filter material 31 is inserted.

The oil/water separating device 10 further comprises a control unit 60 with which the functions of the device can be controlled. In particular, this may include the evaluation of sensor signals of various detectors, the opening and closing of valves and the detection of periods. The control unit 60 further preferably has inputting means for manually inputting control commands. Maintenance work on the apparatus, for example, can by carried out through these control commands. The control unit 60 may also comprise display means for displaying the status of the device and/or warning and service notifications.

The oil/water separating device 10 functions in accordance with the hydrostatic principle of communicating columns. To this end, a housing 20, which may also be referred to as a head housing due to its arrangement, is typically attached above the main filter 30. The housing 20 is connected to the main filter 30 via a connecting opening 23. This connection may be solid; however, the main filter 30 may also be at least one replaceable cartridge filter which is temporarily connected to the housing 20 via an inlet port 32. In particular, this may take place via a tight screw connection.

Condensate can be introduced into the housing 20 via an inlet opening 22. In particular, the condensate 11 stems from an air compressor and is to be treated by the oil/water separating device 10 by oil-containing constituents being removed from the condensate 11. In this case, the condensate 11 flows into the head housing 20 and thence, due to gravity, into the main filter 30 located below it. The main filter 30 is connected via an outlet port 33 to a riser pipe 40 via which treated condensate 11" exits the oil/water separating device 10. This outlet port 33 may also be connected to the riser pipe 40 via a tight screw connection, so that the main filter 30 is replaceable as a whole. Treated condensate 11" leaves the apparatus at the pure-water outlet 42 towards the sewer in the same amount as new condensate 11 flows into the housing 20.

At the height of the condensate level thus generated within the housing 20, a collective drain 71 may be provided which is connected to a collecting container 70 via a valve 72. The valve 72 is, for example, a solenoid valve that can be activated by means of a control unit 60. Free oil fractions 13 that float within the housing 20 on the condensate 11' can be removed and collected via this collective drain 71. These free oil fractions have a density <1 kg/dm³. Thus, a separation of free oil fractions is carried out before the condensate 11 is supplied to the main filter 30, so that pre-purified condensate 11' arrives at the main filter 30. However, the separation of free oil fractions may also be integrated into a cartridge of the main filter 30.

A device for separating heavy, sediment-like constituents with a density >1 kg/dm³ (not shown) may be provided upstream or downstream from the inlet opening 22. It works according to the principle of gravity separation, so that these constituents deposit on the bottom of the device and do not enter the main filter 30.

In the exemplary embodiment of FIG. 1, the head housing 20 has at least one chamber 24 into which the condensate 11 flows and is thence supplied to the main filter 30. This chamber 24 constitutes the main chamber of the head housing 20, which may, however, be supplemented with a second chamber in the form of a pressure relief chamber 21. The condensate 11 is at first introduced into the latter, for pressure relief. Entrained compressed air from the compressor can be discharged in this pressure relief chamber 21, wherein this air can escape via an outlet. This relief air outlet 12 may be routed through a filter mat 25 and also be provided with a closable valve (not shown).

The condensate 11 arrives from this pressure relief chamber 21 in the chamber 24 of the head housing 20, free oil fractions 13 are discharged via the collective drain 71, and the condensate 11' pre-purified in this manner flows off into the main filter 30. This constitutes the normal operation of the device 10, in which a certain condensate level is generated within the chamber 24, in which free oil fractions 13 are continuously removed and purified condensate 11" is discharged into a sewer via a riser pipe 40.

Due to a saturation of the upper layers of the filter 30 or the formation of biological slimy layers, however, the flow resistance of the filter 30 may increase. If this happens, the condensate level increases within the chamber 24, which may result in the device overflowing. Further, in the case of an elevated condensate level, not only do free oil fractions flow off into the collecting container 70 but also unpurified condensate.

Figure 2:
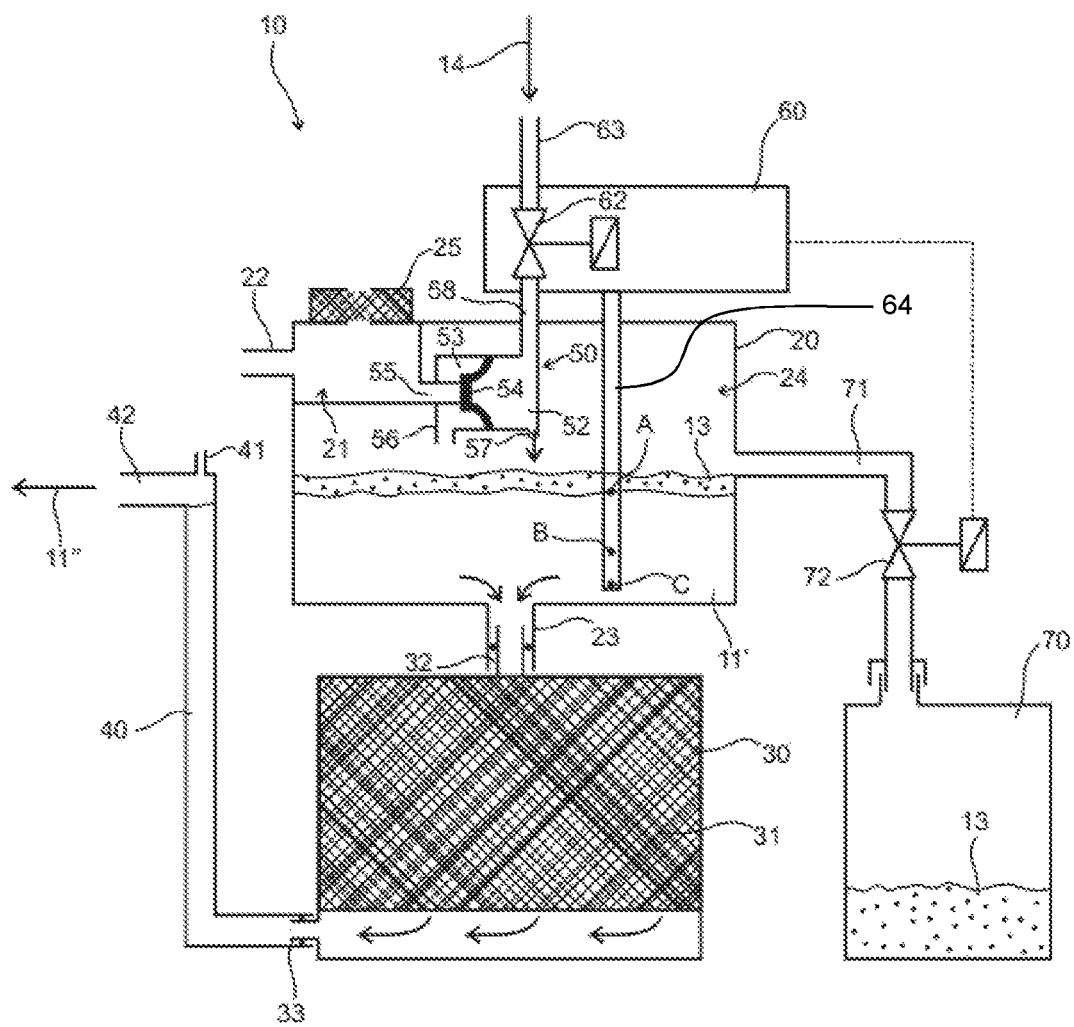
FIG. 2 shows a schematic illustration of the oil/water separating device of FIG. 1 when charged with compressed air.

Therefore, the disclosure provides that the normal operation of the device 10 be supplemented by a pressure operation in which the condensate 11' can be pushed into the main filter 30 by an overpressure, as is shown in FIG. 2. This is preferably done by charging the chamber 24 with control air 14 via a control air pipe 63. At least one sensor means 64 measuring the filling level of condensate 11' is provided in order to detect an elevated condensate level within the chamber 24. This sensor means is connected to the control unit 60 which evaluates the signals of the sensor means 64 and triggers the charging with control air in the event of an elevated filling level. For this purpose, the control unit 60 activates a valve 62 in the control air pipe 63 with which the supply of control air 14 to the chamber 24 can be controlled.

Preferably, control air 14 is introduced into the chamber 14 with an overpressure of up to 0.5 bars, so that a pressure difference is generated between the chamber 24 and the outlet port 33 of the main filter 30, by means of which the condensate 11' is pushed through the filter 30. If the device 10 device is connected to a compressed air pipe with a higher pressure for this purpose, a corresponding pressure reduction may take place upstream of and/or in the valve 62.

For example, the pressure may be reduced from 7 bars to 0.5 bars, which may be accomplished by throttling. Alternatively or additionally, a pressure reduction may also take place downstream of the valve 62, so that it may also be realized, for example, by the valve 50.

The charging with pressure presupposes that the chamber 24 and the connection between the chamber 24 and the main filter 30 are configured to be so tight that no air, or at least no appreciable quantities of air, can escape at this location. It may further be provided that the control unit 60 also seals the valve 72 of the collecting container 70 to be tight with respect to the free oil fractions 13 during the charging with pressure. Furthermore, the supply of new condensate 11 during the charging with pressure is expediently stopped in order also to seal this feed.

In the exemplary embodiment of FIG. 1, a diaphragm valve 50, which is connected to the condensate supply and the control air feed 63, is provided for this purpose within the chamber 24 of the head housing 20. The diaphragm valve 50 comprises two chambers, a control air chamber 52 and a mixture chamber 53. These two chambers are separated from each other by an elastic diaphragm 54. Condensate 11 flows from the pressure relief chamber 21 into the mixture chamber 53 of the diaphragm valve 50 via a mixture inlet 55. FIG. 1 shows how the condensate flows from the mixture chamber 53 into the chamber 24 of the head housing in the normal operation of the oil/water separating device. This takes place via a mixture outlet 56. Treated condensate 11" leaves the apparatus at the pure-water outlet towards the sewer in the same amount as condensate 11 flows from the mixture outlet 56 into the chamber 24. In the process, a certain condensate level is generated in the chamber 24.

If the flow resistance of the main filter 30 increases, this condensate level rises and a filling level A constitutes a critical maximum condensate filling level, for example, which should not be exceeded. If this elevated condensate level A is detected by the sensor means 64, the control unit 60 opens the valve 62 and thus conducts control air 14 into the control air chamber 52 of the diaphragm valve 50. In this case, the sensor means 64 is preferably configured in such a way that only the condensate level is detected, whereas free oil fractions and air above the condensate are ignored. Thus, it is capable of differentiating between condensate and oil or air. The sensor means 64 thus detects the filling level of condensate 11', and not the filling level of free oil fractions 13 above the condensate 11'.

The control air can escape from the control air chamber 52 via a control air outlet 57 and thus arrive in the chamber 24 of the head housing. In this case, the control air outlet 57 preferably has a smaller cross section than the control air inlet 58, so that pressure can be quickly built up in the control air chamber 52 if control air 14 is introduced. Due to this pressure, the diaphragm 54, within the valve 50, moves to the left in the direction of the mixture inlet 55 and seals the latter. Thus, no condensate 11 is able to flow into the chamber 24 any longer. Preferably, the control unit 60 simultaneously also interrupts the feed of condensate 11 into the pressure relief chamber 21. This may be combined, in particular, with an intermediate collection of the condensate upstream of the oil/water separating device 10, or the condensate is supplied to another oil/water separating device connected in parallel.

By closing the mixture inlet 55 by means of the diaphragm 54, no air can escape from the chamber 24 into the pressure relief chamber 21 via this way, either. Preferably, the control unit 60 also closes the valve 72 to the collecting container 70.

By further supplying control air 14 into the chamber 24, the pressure therein rises, whereby the condensate 11 can be pushed through the main filter 30 and the riser pipe 40 towards the outlet 42 and be purified in the process. Thus, the elevated flow resistance of the filter can be overcome and the device can be kept in operation without overflowing. In the process, the control air 14 first serves for closing the mixture inlet 55 by means of the diaphragm 55 and then for building up pressure within the chamber 24. This situation is shown in FIG. 2. The condensate level has reached the maximum filling level A and the diaphragm 54 closes the mixture inlet 55.

Figure 3:
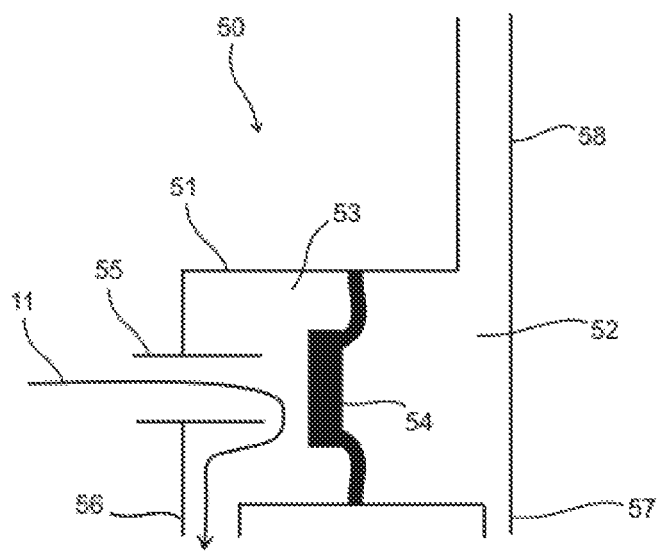
FIG. 3 shows a diaphragm valve of an oil/water separating device in normal operation.
Figure 4:
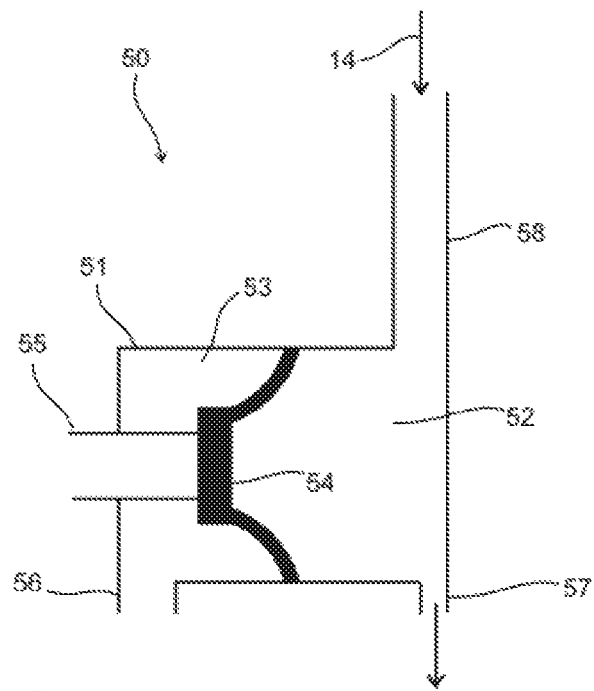
FIG. 4 shows a diaphragm valve of an oil/water separating device when charged with compressed air.

FIGS. 3 and 4 show the mode of operation of the diaphragm valve 50 in a schematic representation, wherein the two chambers 52 and 53 are apparent within a valve housing 51, which are separated from each other by an elastic diaphragm 54. In normal operation (FIG. 3), the diaphragm 54 is positioned so that the mixture inlet 55 is open and condensate is able to flow from the mixture inlet 55 through the mixture chamber 53 and out from the mixture outlet 56. If control air 14 is introduced into the control air inlet 58, pressure builds up within the control air chamber 52, due to which the diaphragm 54 is first pressed against the mixture inlet 55, whereby it seals the latter. The control air exits the control air outlet 57 and thus builds up pressure in the chamber of the head housing.

The control air 14 can be switched off again by the control unit 60 under various conditions. For example, it may be switched off if the condensate level has reached a lower filling level B. If the control air 14 is switched off, the diaphragm 54 returns into its original position (FIG. 1) and unblocks the mixture inlet 55, so that new condensate 11 can flow into the chamber 24. If the condensate level again rises up to the filling level A, a charging with pressure could again take place, so that the normal operation and the charging with pressure are continuously alternated. Thus, the level of the condensate moves between the points A and B.

Furthermore, an error notification may be issued on the control unit 60 if the condensate level in the chamber 24 does not reach a lower filling level B, i.e. remains above this level, even during the charging with pressure. This suggests, for example, that the filter 30 is blocked and/or the diaphragm valve 50 is defective.

The control air 14 may also be switched off after a predefined period, for example, if empirical values show that the filling level in the chamber 24 has dropped to a predefined level corresponding to the level B after this period. Also in this case, another charging with pressure may follow in case of a renewed increase of the level. Thus, in this embodiment, only a level A has to be defined and a timer control has to be realized.

Furthermore, a minimum filling level C may be defined, beneath which the condensate level must not drop. It lies below the level B and thus below the working range between A and B. If the condensate level drops below this minimum filling level C in spite of the control air being switched off, this suggests that the solenoid valve 62 of the control air 14 is defective, for example, and that control air still flows into the diaphragm valve 50. An error notification may also be outputted on the control unit 60 also in this case, for the container could otherwise run out. Thus, the optional point C constitutes an alarm point.

It may also be provided that the control unit 60 output service notifications. This may take place, for example, if a predefined number of cycles has been reached or the duration of a cycle becomes too long. In this case, the cycle constitutes an operation with a pressure charging, i.e., for example, the operation between the levels A and B. A service notification may also be outputted if a service interval has elapsed (e.g. 6 months).

An operation with a pressure charging may also be carried out for maintenance purposes. For this purpose, a corresponding service command may be inputted by the maintenance personnel into the control unit 60, by means of which a control command is generated that causes the above-described feed of control air 14. Thus, the main filter 30 can be squeezed empty and then replaced if it is a cartridge. For this purpose, the screw connections on the inlet port 32 and the outlet port 33 are unfastened, the main filter 30 is screwed off and a fresh filter is screwed on. If, in contrast, the chamber 24 were pumped empty with a pump for this purpose, condensate could be sucked from the filter due to backflow. This would require another valve in the area of the connecting opening 23.

The hydraulic levels within the oil/water separating device operating in accordance with the hydrostatic principle must be distinguished from the sensor levels A, B and C. Hydraulic levels are produced on the condensate discharge of the outlet opening 42, at the oil discharge of the collective drain 71 and due to the level of the condensate above the filter.

The valves used in the above-described exemplary embodiment of the disclosure merely constitute examples, wherein these and other valves are also formed by any other kinds of valve that are suitable for the respective application. For example, the solenoid valve 72 may also be configured like the diaphragm valve 50. Furthermore, other types of valve, such as ball valves, slide gate valves, pinch valves etc. may be used for both valves.

Figure 5:
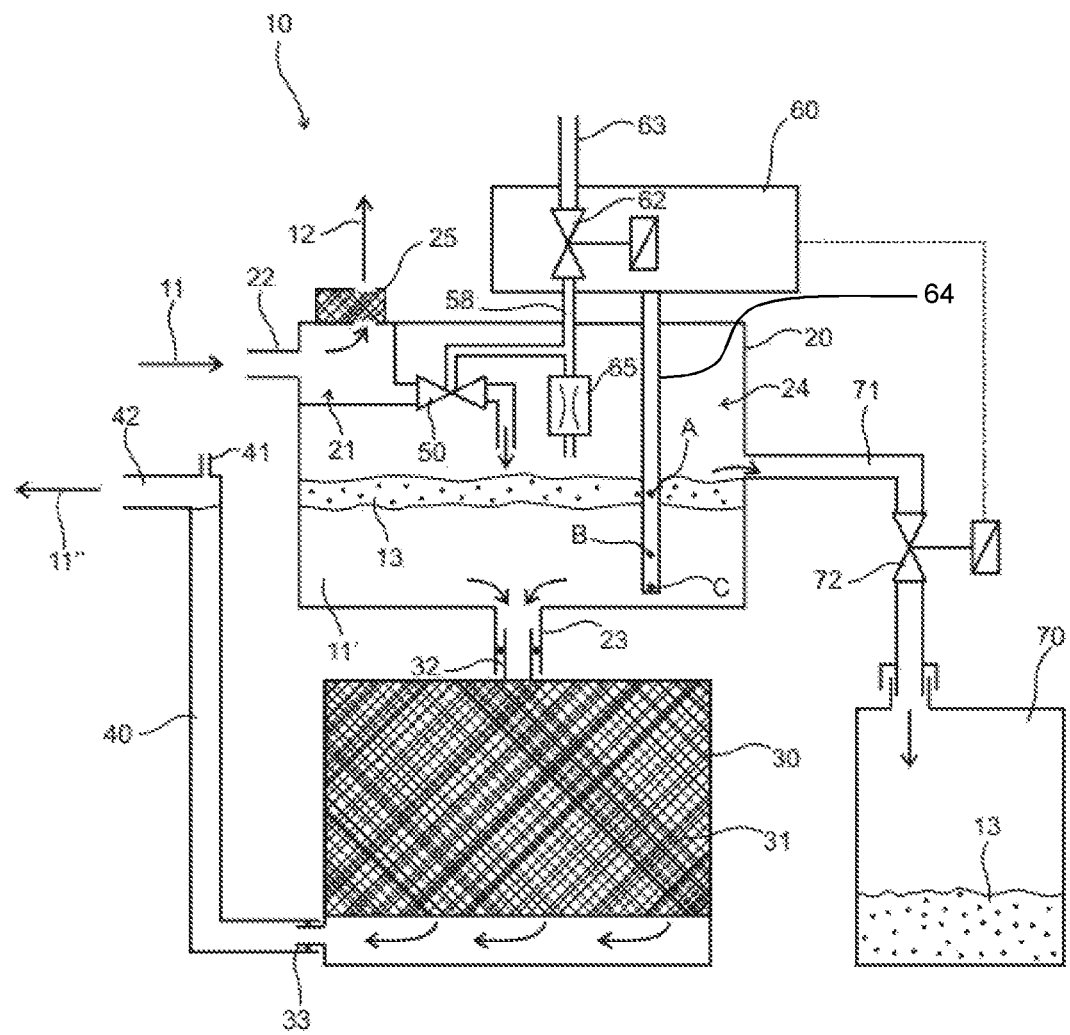
FIG. 5 shows a schematic illustration of a second embodiment of the oil/water separating device according to the disclosure in normal operation.

By way of example, FIG. 5 shows a second embodiment of the oil/water separating device 10' according to the disclosure in normal operation. The essential components and functions of this oil/water separating device 10' may correspond to those of the first embodiment according to FIG. 1. However, the valve 50 is not configured as a diaphragm valve with the above-described functions. Rather, another type of valve may be used with which the feed of condensate into the second chamber 24 may be controlled. Condensate 11 still flows from the pressure relief chamber 21 through the valve 50 into the second chamber 24, wherein the valve 50 can be activated, in particular, by the control air if the condensate 11' reaches the level A. For this purpose, the control air inlet 58 is branched so that a part of the control air can be conducted to the valve 50 in order to activate it. Additional control air is first fed to a throttling means 65 prior to arriving in the second chamber 24 to increase the pressure there. In this way, a pressure reduction for the control air can take place within the chamber. However, this pressure reduction may also be dispensed with if the control air of the device can already be supplied with the desired pressure or throttling takes place at another location.

The valve 50 is preferably configured such that it opens again when the control air is switched off. However, the valve may also be capable of being activated by the control unit 60, for example in order to cause the valve to open. It may also be possible to trigger the closing of the valve 50 by means of the control unit 60.

The invention claimed is:

1. An oil/water separating device for removing oil-containing constituents from an oil/water mixture, the oil/water separating device comprising:
    a main filter configured to separate oil-containing constituents from the oil/water mixture, wherein an oil/ water mixture to be purified is supplied to the main filter and is removed from the oil/water separating device after passing through the main filter, and the oil/water separating device is configured for supplying and removing of these liquids in accordance with the hydrostatic principle, wherein a housing, defining a chamber and including a connecting opening in a bottom thereof, is attached above the main filter, wherein the oil/water separating device provides a normal operation, wherein the oil/water separating device operates without an additional energy supply, the oil/water mixture to be purified flows from the housing, due to gravity, into the main filter located below, and the oil/water separating device further includes a control air pipe having a valve positioned therein and communicating with the chamber and a control unit connected to the valve and configured to temporarily charge the chamber with control air, such that the oil/water mixture is configured to be pushed out the connecting opening and through the main filter by overpressure.

2. The oil/water separating device according to claim 1, wherein a sensor detects the oil/water mixture filling level provided in the oil/water separating device and is connected to the control unit.

3. The oil/water separating device according to claim 2, wherein the control unit is configured for temporarily charging the oil/water separating device with control air if a predetermined oil/water mixture filling level is detected by the sensor.

4. The oil/water separating device according to claim 2, wherein the control unit is configured to cease charging the oil/water separating device with control air if a predetermined oil/water mixture filling level is detected by the sensor.

5. The oil/water separating device according to claim 1, wherein the control unit is configured for charging the oil/water separating device with control air because of a control command to the control unit.

6. The oil/water separating device according to claim 1, wherein the control air and the oil/water mixture are conducted into the chamber of the housing via a diaphragm valve, wherein the diaphragm valve has a control air chamber and a mixture chamber separated by a diaphragm, and the diaphragm valve has a mixture inlet for supplying oil/water mixture into the mixture chamber and a control air inlet for supplying control air into the control air chamber, and a mixture outlet for removing the oil/water mixture from the mixture chamber into the chamber of the housing and a control air outlet for removing the control air from the control air chamber into the chamber of the housing are provided, wherein the mixture inlet can be closed by the diaphragm by charging the control air chamber with control air.

7. The oil/water separating device according to claim 6, wherein the control air outlet of the diaphragm valve has a smaller opening cross section than the control air inlet.

8. The oil/water separating device according to claim 6, wherein the feed of oil/water mixture to the diaphragm valve can be interrupted during the charging of the chamber of the housing with control air by the control unit.

9. The oil/water separating device according to claim 6, wherein the housing has an inlet opening via which oil/water mixture can be conducted into a pressure relief chamber within the housing, from which the oil/water mixture can be conducted into the chamber of the housing.

10. The oil/water separating device according to claim 9, wherein the pressure relief chamber is connected to the mixture chamber of the diaphragm valve via the mixture inlet.

11. The oil/water separating device according to claim 1, wherein the control air has an overpressure in the order of 0.3-1 bars.

12. The oil/water separating device according to claim 1, wherein free oil fractions floating on the oil/water mixture in the chamber of the housing can be discharged from the chamber via a collective drain.

13. The oil/water separating device according to claim 12, wherein the collective drain can be closed during the charging of the chamber with control air by the control unit.

14. The oil/water separating device according to claim 1, wherein the main filter is formed by at least one filter cartridge that can be temporarily connected to the housing.

* * * * *